(12) United States Patent
Ross et al.

(10) Patent No.: US 8,326,527 B2
(45) Date of Patent: Dec. 4, 2012

(54) DOWNLOADED DESTINATIONS AND INTERFACE FOR MULTIPLE IN-VEHICLE NAVIGATION DEVICES

(75) Inventors: Steven J. Ross, Livonia, MI (US); Edward P. Chrumka, Grosse Pointe Park, MI (US)

(73) Assignee: General Motors LLC, Detroit, MI (US)

(*) Notice: Subject to any disclaimer, the term of this patent is extended or adjusted under 35 U.S.C. 154(b) by 362 days.

(21) Appl. No.: 12/651,436

(22) Filed: Dec. 31, 2009

(65) Prior Publication Data

US 2011/0161000 A1     Jun. 30, 2011

(51) Int. Cl.
G01C 21/30     (2006.01)

(52) U.S. Cl. ......... 701/420; 701/410; 701/416; 701/421

(58) Field of Classification Search .................. None
See application file for complete search history.

(56) References Cited

U.S. PATENT DOCUMENTS

| | | | | |
|---|---|---|---|---|
| 5,172,321 A * | 12/1992 | Ghaem et al. | .............. | 455/456.5 |
| 5,543,789 A * | 8/1996 | Behr et al. | .............. | 340/995.12 |
| 5,648,769 A * | 7/1997 | Sato et al. | .............. | 340/988 |
| 5,654,908 A * | 8/1997 | Yokoyama | .............. | 708/109 |
| 5,987,381 A * | 11/1999 | Oshizawa | .............. | 701/427 |
| 6,108,631 A * | 8/2000 | Ruhl | .............. | 704/270 |
| 6,349,257 B1 * | 2/2002 | Liu et al. | .............. | 701/438 |
| 6,405,126 B1 * | 6/2002 | Palomo et al. | .............. | 701/428 |
| 6,978,206 B1 * | 12/2005 | Pu et al. | .............. | 701/446 |
| 7,043,357 B1 * | 5/2006 | Stankoulov et al. | .............. | 701/446 |
| 7,475,057 B1 * | 1/2009 | Obradovich | .............. | 701/532 |
| 7,493,210 B2 * | 2/2009 | Nassiff et al. | .............. | 701/532 |
| 7,877,204 B2 * | 1/2011 | Sprigg | .............. | 701/422 |
| 7,890,259 B2 * | 2/2011 | Kamdar et al. | .............. | 701/420 |
| 8,019,581 B2 * | 9/2011 | Sheha et al. | .............. | 703/8 |
| 2003/0023371 A1 * | 1/2003 | Stephens | .............. | 701/209 |
| 2006/0100779 A1 * | 5/2006 | Vergin | .............. | 701/211 |
| 2006/0129311 A1 * | 6/2006 | Bauman et al. | .............. | 701/201 |
| 2006/0178813 A1 * | 8/2006 | Chen | .............. | 701/202 |
| 2007/0021914 A1 * | 1/2007 | Song | .............. | 701/213 |
| 2008/0195306 A1 * | 8/2008 | Moinzadeh et al. | .............. | 701/201 |
| 2008/0306681 A1 * | 12/2008 | Piwowarski et al. | .............. | 701/207 |
| 2008/0306682 A1 * | 12/2008 | Dorfstatter et al. | .............. | 701/207 |
| 2009/0063037 A1 * | 3/2009 | Stevens et al. | .............. | 701/207 |
| 2009/0164110 A1 * | 6/2009 | Basir | .............. | 701/117 |

* cited by examiner

*Primary Examiner* — Richard M. Camby
(74) *Attorney, Agent, or Firm* — Leydig, Voit & Mayer, Ltd.

(57) ABSTRACT

The described method and system for providing navigation assistance to a user of a mobile navigation system includes presenting a web interface to the user, the web interface having one or more user-selectable fields including a destination field. Through the interface, the user can identify a desired destination and download data associated with the destination to a database associated with a call center. Later, the user may download the data to their mobile navigation device, e.g., their vehicle telematics unit, for navigational assistance. In an implementation, such assistance is provided in the form of turn-by-turn directions.

18 Claims, 7 Drawing Sheets

DOWNLOADED DESTINATIONS AND INTERFACE FOR MULTIPLE IN-VEHICLE NAVIGATION DEVICES

BACKGROUND OF THE INVENTION

As the availability and sophistication of in-vehicle informational devices grows, drivers increasingly rely on such systems to bear a larger portion of the driving burden. One area in particular in which such devices excel is the provision of navigation assistance. For example, drivers often use such systems to identify destinations and obtain directions to travel to such destinations. Thus, a user may use an on-board navigation system to locate a nearby gas station, and then may also use the on-board navigation system to obtain directions to the selected gas station. Although a vehicle telematics unit may perform many functions other than navigation, the navigational capabilities are of primary importance to many drivers.

The services of such systems may be accessed through interfaces such as voice-recognition computer applications, touch-screen computer displays, computer keyboards, or a series of buttons on the dashboard or console of a vehicle. With respect to navigation, driving directions may be accessed through services that offer maps and driving directions. To use these types of services, the user may specify desired starting and/or ending addresses. Sources of routing services include off-board navigation servers, onboard data sources (e.g., databases, CDs, DVDs, etc.) and other suitable sources.

In many cases, regardless of the mechanism by which routing data is obtained, the directions may be displayed in the vehicle in a visual or textual format that shows at least a portion of the route. For example, a map portion related to the user's current position may be displayed, and upcoming required actions, such as turns or branches, may be graphically illustrated. In this manner, the user may follow the visual directions and eventually arrive at the desired destination if all directions are followed correctly.

However, while such systems provide a substantial benefit to users, there is still an unfilled need for a system that is capable of providing a custom interface, for example, to allow retrieval of destinations based on the vehicles navigation capabilities, number of destinations, and user preferences.

BRIEF SUMMARY OF THE INVENTION

The invention provides the user with an optimal in-vehicle navigation experience by improving task completion on navigation tasks when secondary devices are available or vehicle/network conditions force the use of such devices. In an example of the disclosed principles, a navigation service provider provides both navigation assistance and destination download functionality.

In particular, the system customizes a voice user experience based on the vehicle's capabilities, i.e., the navigation options available, as well as user preferences, i.e., which navigation system to use, whether and where to start at a route step/geo point in a route. In addition, the system accounts for a plurality of destinations via, i.e., a single download optimized list, a fail over list, etc., as well as current vehicle network conditions such as packet availability.

It will be appreciated that other examples of the invention provide for a system and a computer-readable medium having computer-executable instruction for carrying out this or other methods in keeping with the described principles.

Other objects and advantages of the invention will become apparent upon reading the following detailed description and upon reference to the drawings.

DETAILED DESCRIPTION OF THE INVENTION

Before discussing the details of the invention and the environment wherein the invention may be used, a brief overview is given to guide the reader. In overview, not intended to limit the claims, the invention provides a system and method for allowing users of mobile navigational devices to remotely enter destinations via a web interface, and to later have these selected destinations wirelessly downloaded to the mobile device, e.g., in conjunction with the provision of navigation assistance.

Figure 1:
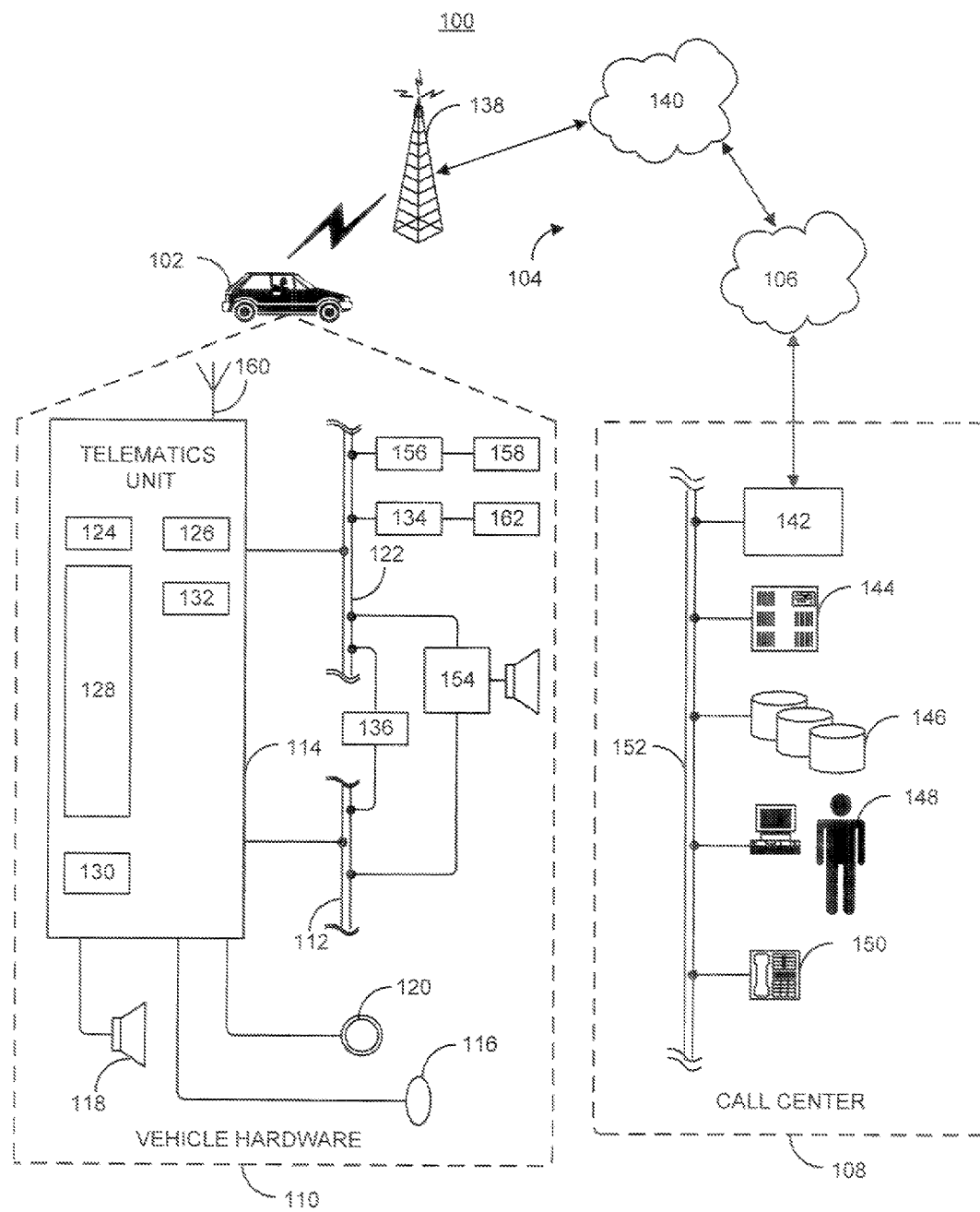
FIG. 1 is a schematic diagram of an operating environment for a mobile vehicle communication system.

An exemplary environment in which the invention may operate is described hereinafter. It will be appreciated that the described environment is an example, and does not imply any limitation regarding the use of other environments to practice the invention. With reference to FIG. 1 there is shown an example of a communication system 100 that may be used with the present method and generally includes a vehicle 102, a wireless carrier system 104, a land network 106 and a call center 108. It should be appreciated that the overall architecture, setup and operation, as well as the individual components of a system such as that shown here are generally known in the art. Thus, the following paragraphs simply provide a brief overview of one such exemplary information system 100; however, other systems not shown here could employ the present method as well.

Vehicle 102 is preferably a mobile vehicle such as a motorcycle, car, truck, recreational vehicle (RV), boat, plane, etc., and is equipped with suitable hardware and software that enables it to communicate over system 100. Some of the vehicle hardware 110 is shown generally in FIG. 1 including a telematics unit 114, a microphone 116, a speaker 118 and buttons and/or controls 120 connected to the telematics unit 114. Operatively coupled to the telematics unit 114 is a network connection or vehicle bus 122. Examples of suitable network connections include a controller area network (CAN), a media oriented system transfer (MOST), a local interconnection network (LIN), an Ethernet, and other appropriate connections such as those that conform with known ISO, SAE, and IEEE standards and specifications, to name a few.

The telematics unit 114 is an onboard device that provides a variety of services through its communication with the call center 108, and generally includes an electronic processing device 128 one or more types of electronic memory 130, a cellular chipset/component 124, a wireless modem 126, a dual antenna 160 and a navigation unit containing a GPS chipset/component 132. In one example, the wireless modem 126 is comprised of a computer program and/or set of software routines executing within processing device 128. The cellular chipset/component 124 and the wireless modem 126 may be called the network access device (NAD) 180 of the telematics unit 114.

The telematics unit 114 provides too many services to list them all, but several examples include: turn-by-turn directions and other navigation-related services provided in conjunction with the GPS based chipset/component 132; airbag deployment notification and other emergency or roadside assistance-related services provided in connection with various crash and or collision sensor interface modules 156 and sensors 158 located throughout the vehicle. Infotainment-related services where music, Web pages, movies, television programs, video games and/or other content is downloaded by an infotainment center 136 operatively connected to the telematics unit 114 via vehicle bus 122 and audio bus 112. In one example, downloaded content is stored for current or later playback.

Again, the above-listed services are by no means an exhaustive list of all the capabilities of telematics unit 114, as should be appreciated by those skilled in the art, but are simply an illustration of some of the services that the telematics unit 114 is capable of offering. It is anticipated that telematics unit 114 include a number of known components in addition to those listed above.

Vehicle communications preferably use radio transmissions to establish a voice channel with wireless carrier system 104 so that both voice and data transmissions can be sent and received over the voice channel. Vehicle communications are enabled via the cellular chipset/component 124 for voice communications and a wireless modem 126 for data transmission. In order to enable successful data transmission over the voice channel, wireless modem 126 applies some type of encoding or modulation to convert the digital data so that it can communicate through a vocoder or speech codec incorporated in the cellular chipset/component 124. Any suitable encoding or modulation technique that provides an acceptable data rate and bit error can be used with the present method. Dual mode antenna 160 services the GPS chipset/component and the cellular chipset/component.

Microphone 116 provides the driver or other vehicle occupant with a means for inputting verbal or other auditory commands, and can be equipped with an embedded voice processing unit utilizing a human/machine interface (HMI) technology known in the art. Conversely, speaker 118 provides verbal output to the vehicle occupants and can be either a stand-alone speaker specifically dedicated for use with the telematics unit 114 or can be part of a vehicle audio component 154. In either event, microphone 116 and speaker 118 enable vehicle hardware 110 and call center 108 to communicate with the occupants through audible speech. The vehicle hardware also includes one or more buttons or controls 120 for enabling a vehicle occupant to activate or engage one or more of the vehicle hardware components 110. For example, one of the buttons 120 can be an electronic push button used to initiate voice communication with call center 108 (whether it be a live advisor 148 or an automated call response system). In another example, one of the buttons 120 can be used to initiate emergency services.

The audio component 154 is operatively connected to the vehicle bus 122 and the audio bus 112. The audio component 154 receives analog information, rendering it as sound, via the audio bus 112. Digital information is received via the vehicle bus 122. The audio component 154 provides AM and FM radio, CD, DVD, and multimedia functionality independent of the infotainment center 136. Audio component 154 may contain a speaker system, or may utilize speaker 118 via arbitration on vehicle bus 122 and/or audio bus 112.

The vehicle crash and/or collision detection sensor interface 156 are operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

Vehicle sensors 162, connected to various sensor interface modules 134 are operatively connected to the vehicle bus 122. Example vehicle sensors include but are not limited to gyroscopes, accelerometers, magnetometers, emission detection and/or control sensors, and the like. Example sensor interface modules 134 include power train control, climate control, and body control, to name but a few.

Wireless carrier system 104 is preferably a cellular telephone system or any other suitable wireless system that transmits signals between the vehicle hardware 110 and land network 106. According to an example, wireless carrier system 104 includes one or more cell towers 138, base stations and/or mobile switching centers (MSCs) 140, as well as any other networking components required to connect the wireless system 104 with land network 106. A component in the mobile switching center may include a remote data server 180. As appreciated by those skilled in the art, various cell tower/base station/MSC arrangements are possible and could be used with wireless system 104. For example, a base station and a cell tower could be co-located at the same site or they could be remotely located, and a single base station could be coupled to various cell towers or various base stations could be coupled with a single MSC, to but a few of the possible arrangements. Preferably, a speech codec or vocoder is incorporated in one or more of the base stations, but depending on the particular architecture of the wireless network, it could be incorporated within a Mobile Switching Center or some other network components as well.

Land network 106 can be a conventional land-based telecommunications network that is connected to one or more landline telephones and connects wireless carrier network 104 to call center 108. For example, land network 106 can include a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

Call Center (OCC) 108 is designed to provide the vehicle hardware 110 with a number of different system back-end functions and, according to the example shown here, generally includes one or more switches 142, servers 144, databases 146, live advisors 148, as well as a variety of other telecommunication and computer equipment—for example, a modem 150—that is known to those skilled in the art. These various call center components are preferably coupled to one another via a network connection or bus 152, such as the one previously described in connection with the vehicle hardware 110. Switch 142, which can be a private branch exchange (PBX) switch, routes incoming signals so that voice transmissions are usually sent to either the live advisor 148 or an automated response system, and data transmissions are passed on to a modem 150 or other piece of equipment for demodulation and further signal processing.

The modem 150 preferably includes an encoder, as previously explained, and can be connected to various devices such as a server 144 and database 146. For example, database 146 could be designed to store subscriber profile records, subscriber behavioral patterns, or any other pertinent subscriber information. Although the illustrated example has been described as it would be used in conjunction with a manned call center 108, it will be appreciated that the call center 108 can be any central or remote facility, manned or unmanned, mobile or fixed, to or from which it is desirable to exchange voice and data.

As noted above, the system and method described herein provide a unique user interface and integrated system for destination selection and download. In particular, the system allows users of mobile navigational devices to remotely enter destinations via a web interface, and to later have these selected destinations wirelessly downloaded to the mobile device, e.g., in conjunction with the provision of navigation assistance.

Figure 2:
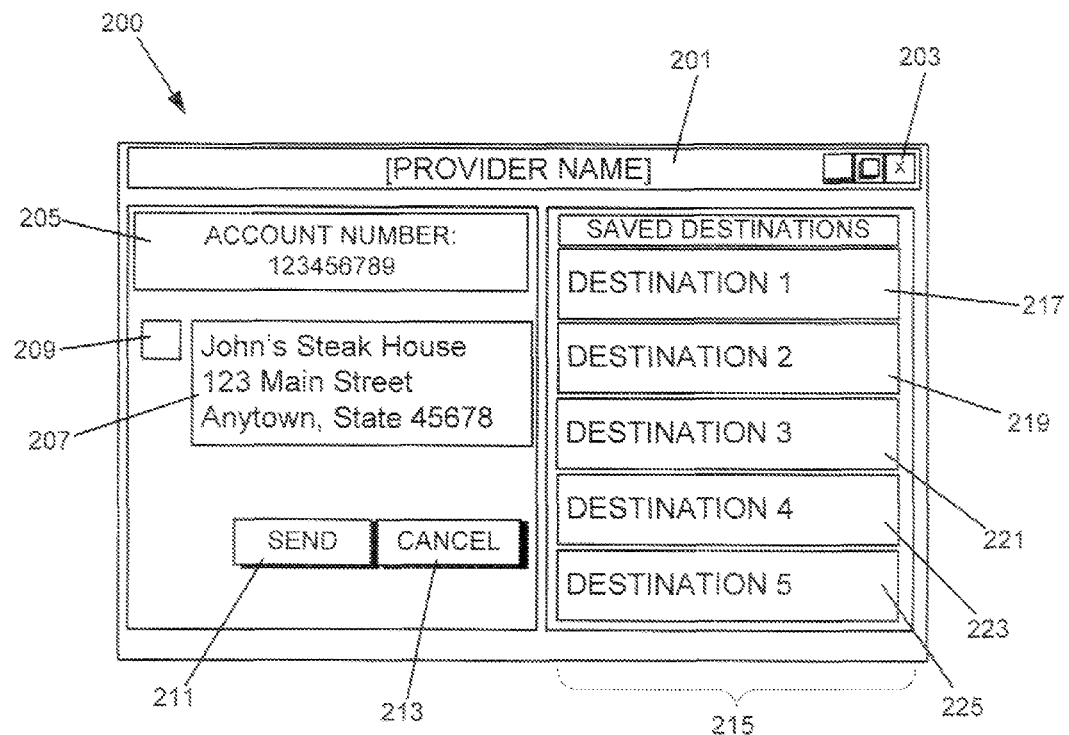
FIG. 2 is a schematic diagram of a web user interface in keeping with the described principles for allowing a user to identify and select destination points for later wireless download to the user's mobile device.

FIG. 2 is a schematic diagram of a web user interface 200 usable in an implementation of the described principles to allow a user to identify and select destinations for download to the user's in-vehicle telematics units, possibly in conjunction with navigation directions such as turn-by-turn directions or the like. The interface 200 is illustrated in the form of a browser or application window 201 or pane, although it will be appreciated that other forms may be used. The illustrated application window 201 includes a number of standard features including a header bar with window controls 203 for maximizing, minimizing, and closing the window 201.

The illustrated interface 200 further includes an account information field 205 for displaying all or a portion of the user's navigation services account number. The account number data in the account information field 205 is used to associate the information input by the user in interface 200 with the user's mobile navigation system, i.e., in a mobile vehicle telematics unit, for later download. The display of a partial account number, e.g., the last four digits of the account number, may be used for security reasons if desired.

The interface 200 is a web interface and is supplied by the navigation services provider. Moreover, the information received via the interface 200 is stored by the navigation services provider, either on the same server that supports the web interface or elsewhere, e.g., a database or server associated with the call center, depending upon implementation preferences.

Continuing, the illustrated application window 201 includes a candidate destination field 207. The data displayed in this field 207 is the result of a user having identified the candidate destination via a mapping service such as MAPQUEST or otherwise. The format and extent of data in the candidate destination field 207 is not critical. For example, an establishment name or person name may be presented in isolation, or the data may include address information as well, as in the illustrated example.

The candidate destination field 207 has associated therewith a selection check box 209, allowing the user to select the destination for storage and later download to their mobile navigation device. Once a candidate destination has been identified in candidate destination field 207 and selected via the selection check box 209, the user may select a send button 211 to send the selected candidate destination to the provider for later download. Alternatively, the user may select a cancel button 213, in order to clear the candidate destination field 207 and leave the program or run another destination search.

In one optional aspect, the user may also manage their previously stored destinations via the interface 200. In particular, the interface 200 provides a saved destinations field 215 containing the user's previously found, selected, and uploaded destinations, all or some of which may have also already been downloaded to the user's telematics unit. In the illustrated example, several saved destinations are shown in the saved destinations field 215, including Destination 1 (217), Destination 2 (219), Destination 3 (221), Destination 4 (223), and Destination 5 (225).

The user may manage these saved destinations 215 by selecting one or more of them and altering or deleting the selected entries. Any changes made to the saved destinations 215 will be later reconciled in the user's telematics unit when a destination download is next executed.

Figure 3:
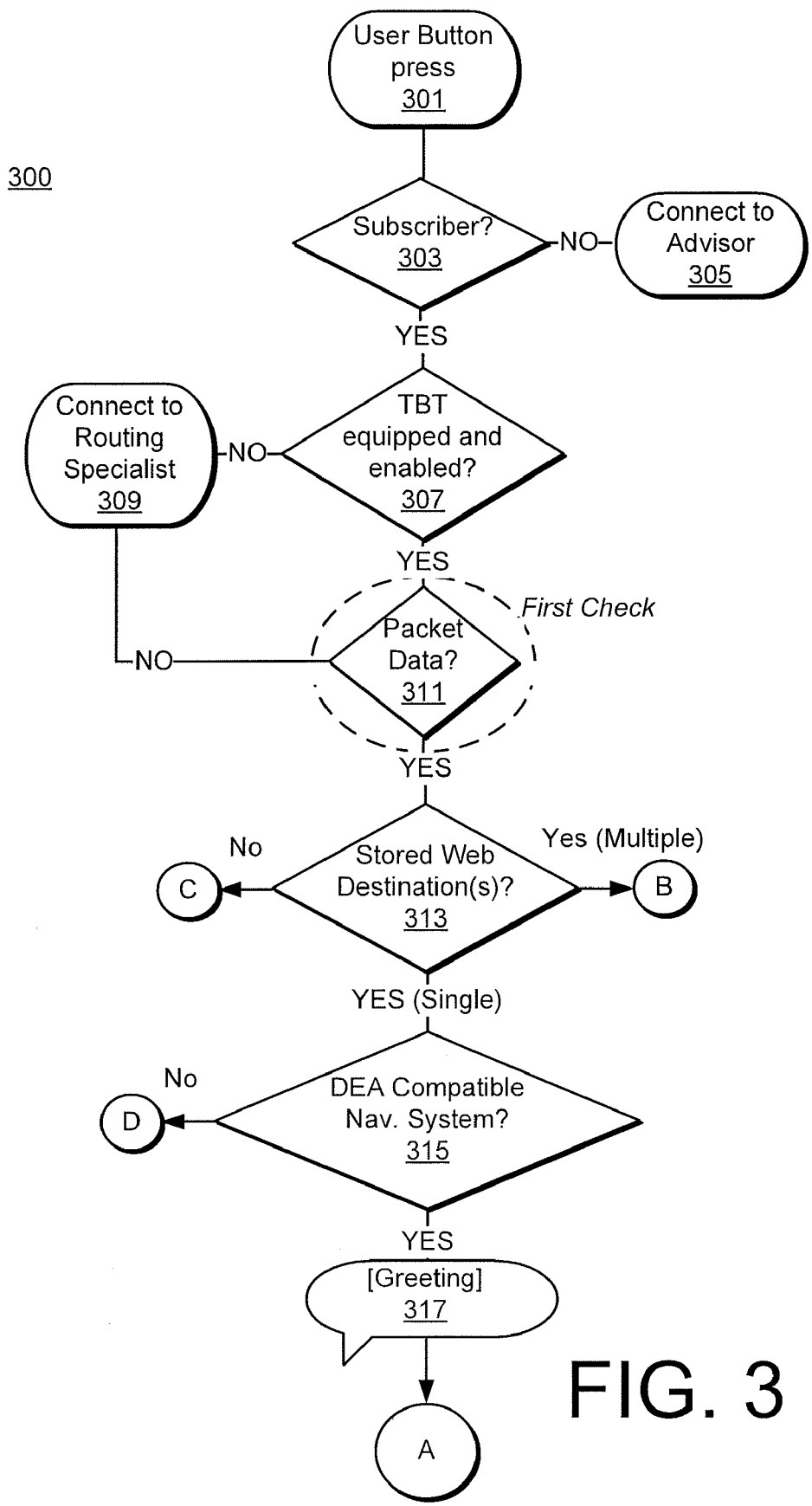
FIG. 3 is a flow chart showing a process of downloading selected destinations to a user's mobile device in keeping with the described principles.

FIG. 3 is a flow chart illustrating the initial portion of a download process 300 for downloading stored destinations to a user's vehicle navigation unit, e.g., telematics unit 114. The download process 300 begins at stage 301 when a user of the mobile system presses a button or activates another selection mechanism to indicate a desire to begin the download process. Once such a selection is received by the system, the process moves to stage 303, wherein the local device, e.g., telematics unit 114, determines whether the user is a current subscriber, or, more accurately, whether there is a valid current subscription associated with the device that the user is using.

If it is determined at stage 303 that there is no current subscription, then the process flows to stage 305, where the system contacts an advisor on behalf of the user, e.g., to set up a subscription. Otherwise, the process 300 flows to stage 307, wherein the system determines if the device is equipped and enabled to receive, process, and display turn-by-turn directions. It will be appreciated that turn-by-turn directions are directions that instruct a user at a roadway level as to which roads to drive on and which direction to turn on those roads.

If it is determined at stage 307 that the device is not equipped and enabled to receive, process, and display turn-by-turn directions, then the process 300 flows to stage 309, wherein the device contacts a routing specialist to enable the device for turn-by-turn directions. After stage 309, or directly after stage 307 if it is determined that the device is in fact already equipped and enabled to receive, process, and display turn-by-turn directions, then the process 300 flows to stage 311. At this stage, the process 300 ensures that the device is ready to receive packet data before proceeding.

Subsequently at stage 313, the process 300 determines whether there are new stored destinations for the user. Such destinations would have been previously selected and stored via an interface as described with reference to FIG. 2. There may be no new destinations, a single new destination, or multiple new destinations. If there are no destinations, the process 300 continues to transition point C. If there are multiple new destination points, the process 300 continues to transition point B. Otherwise, i.e., if there is a single new destination, the process 300 continues to stage 315, wherein it is determined whether the device is DEA compatible. If the system is not DEA compatible, then the process flows to stage D. Otherwise the process 300 continues to stage 317, wherein the device provides a greeting, e.g., a voice greeting, to the user.

Figure 4:
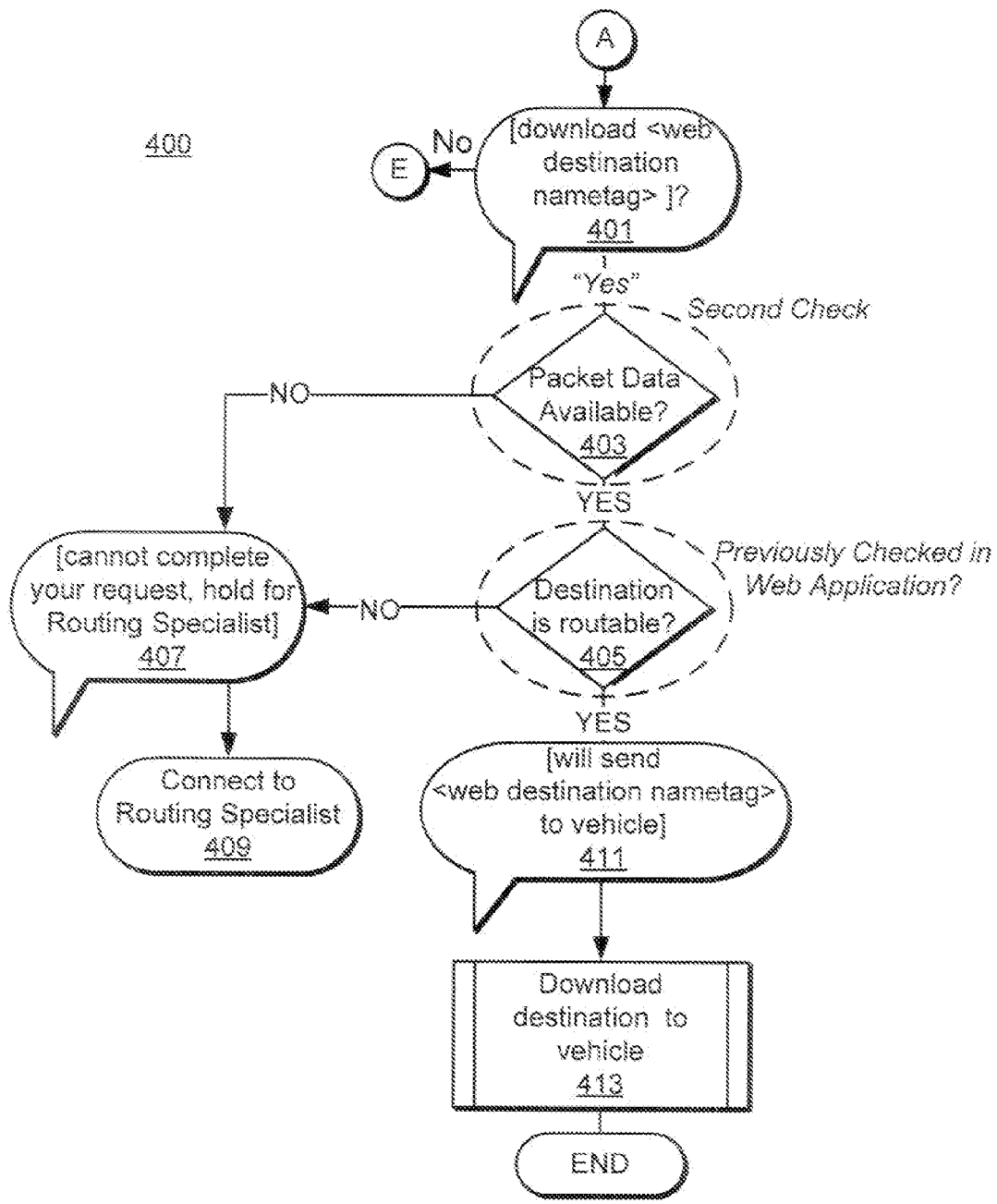
FIG. 4 is a flowchart continuing the flowchart of FIG. 3 showing a process of downloading selected destinations to a user's mobile device.

Turning to FIG. 4, which shows a process 400 corresponding to the continuation of process 300, the device queries the user at stage 401 as to whether the system should download the destination nametag. If the user declines, the process moves to transition point E. Otherwise, the process 400 flows to stage 403, wherein the system checks the readiness of the device to receive packet data. If the device is not ready for such data, the process 400 flows to stage 407, wherein the device notifies the user that a routing specialist will be contacted. The routing specialist is then contacted in stage 409.

If it was determined at stage 403 that the device is ready to accept packet data, then the process 400 flows to stage 405, wherein it is determined whether the destination is routable. It should be noted that the routability of the destination may have been checked at the time that the user selected the destination in the web interface, e.g., pursuant to FIG. 2.

If the destination is not routable, then the process 400 flows to stage 407, which proceeds as described above. Otherwise, the process 400 flows to stage 411, wherein the device notifies the user that the destination nametag will be sent. In stage 413, the destination is downloaded to the user's mobile device.

Figure 5:
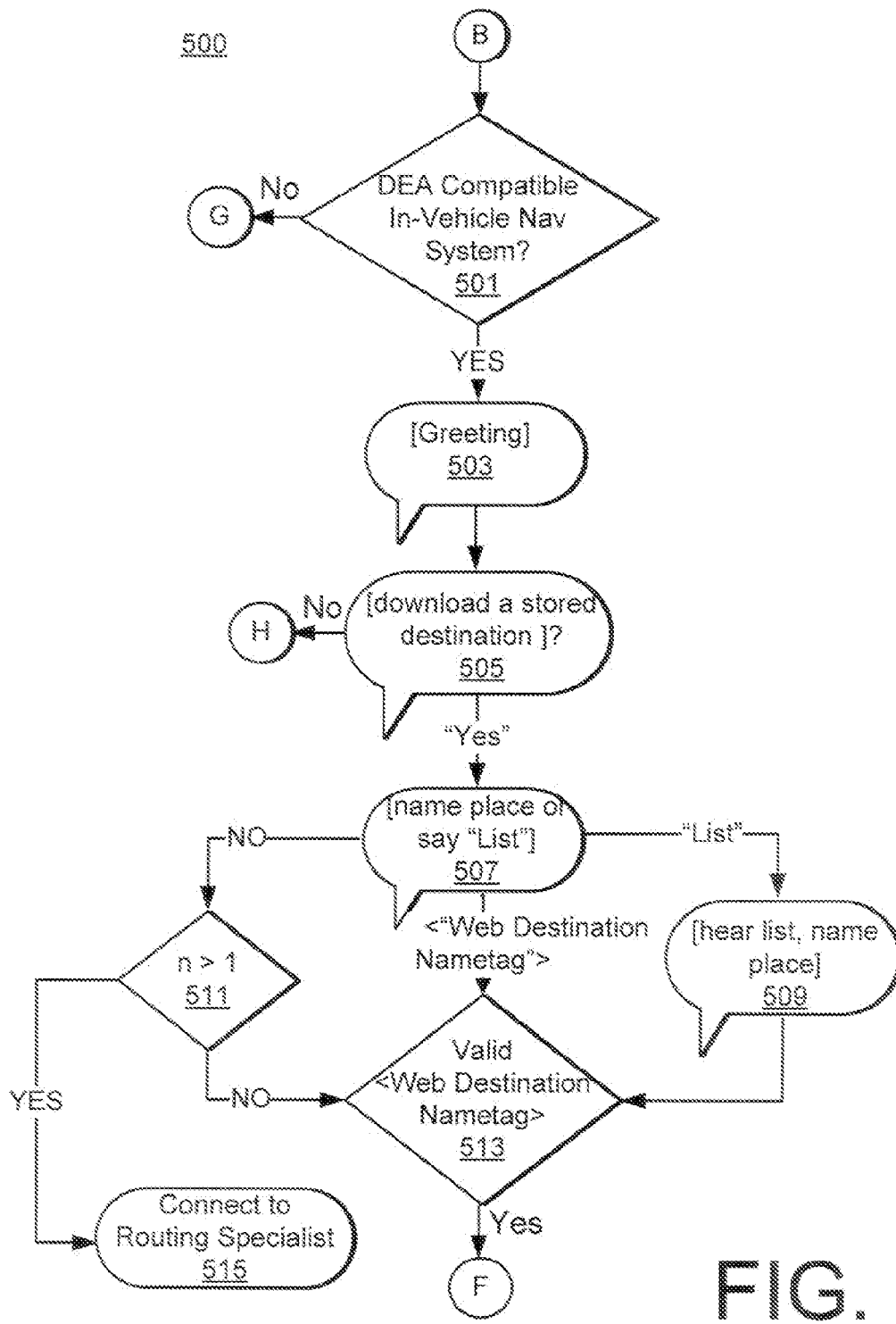
FIG. 5 is a flow chart showing a process of working with previously stored destinations in conjunction with the provision of navigational assistance.

Turning to FIG. 5, which is entered from transition point B, the process 500 begins with a check at stage 501 as to whether the in vehicle navigation system is DEA compatible. If it is determined at stage 501 that the vehicle navigation system is not DEA compatible, then the process 500 flows to transition point G. Otherwise, the process 500 flows to stage 503, wherein the device greets the user, e.g., via a spoken greeting or otherwise. At stage 505, the device queries the user whether the system should download a stored destination.

If the user responds in the negative, the process 500 flows to transition point H. Otherwise, the process flows to stage 507, and the device queries the user to either state the destination name or request a listing of destinations. If the user requests a list, then the process 500 flows to stage 509, wherein the device reads or displays a list of destinations to the user and receives a user selection of a destination and flows to stage 513. If the user specifies a single destination name pursuant to the query of stage 507, the process flows directly to stage 513. At stage 513, if the destination nametag is valid, the process flows to transition point F, which begins the process 600 of FIG. 6.

If the user responds in the negative at stage 507, the process 500 flows to stage 511, wherein, if there is more than 1 possible destination, the process flows onward to stage 515 to contact a routing specialist.

Figure 6:
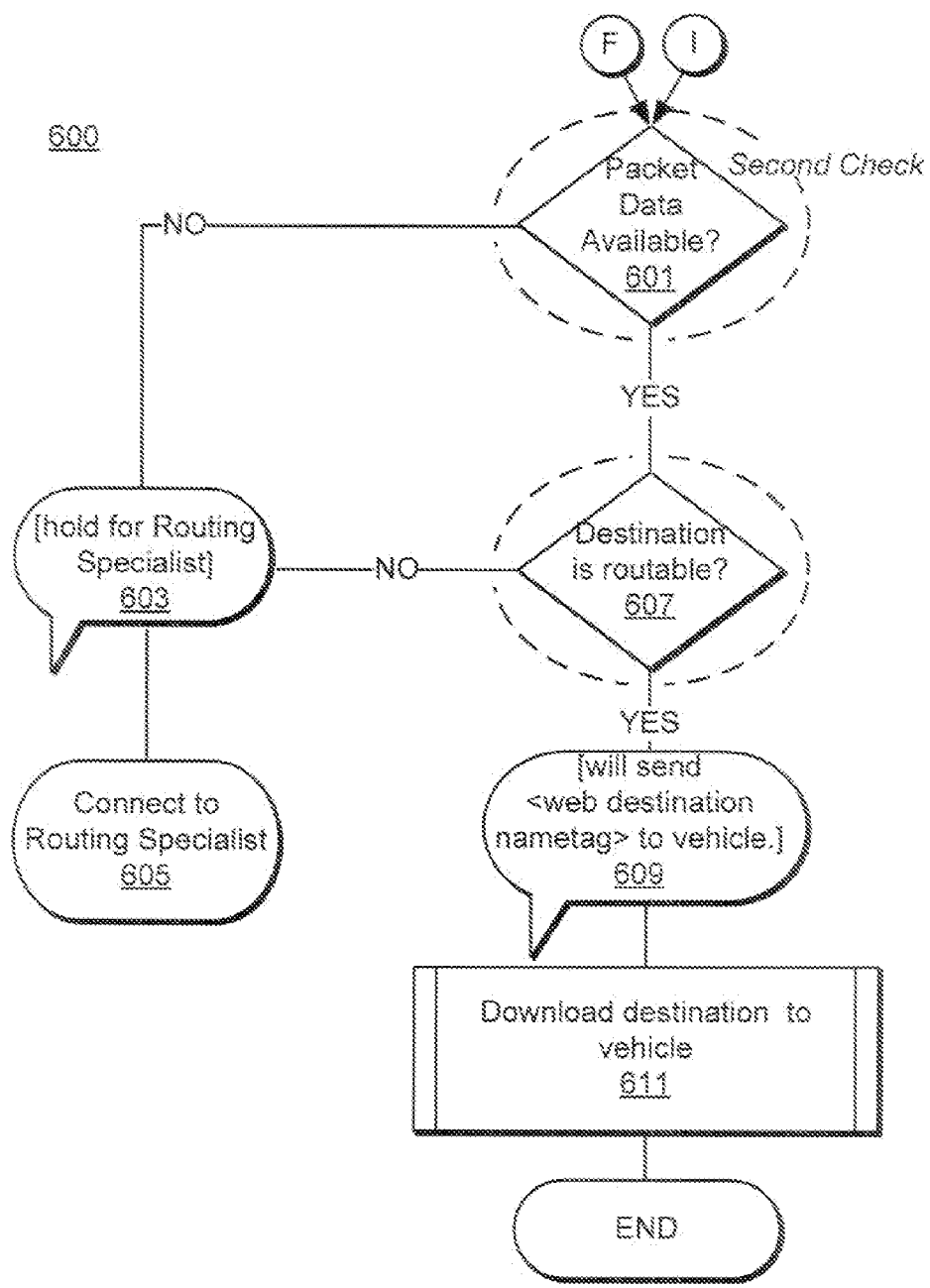
FIG. 6 is a flow chart showing a further process of working with previously stored destinations in conjunction with the provision of navigational assistance.

Turning now to FIG. 6, which begins at transition point F, at stage 601, the system checks the readiness of the device to receive packet data. If the device is not ready for such data, the process 600 flows to stage 603, wherein the device notifies the user that a routing specialist will be contacted. The routing specialist is then contacted in stage 605.

If it was determined at stage 601 that the device is ready to accept packet data, then the process 600 flows to stage 607, wherein it is determined whether the destination is routable. If the destination is not routable, then the process flows to stage 603, which proceeds as described above. Otherwise, the process 600 flows to stage 609, wherein the device notifies the user that the destination nametag will be sent. In stage 611, the destination is downloaded to the user's mobile device.

Figure 7:
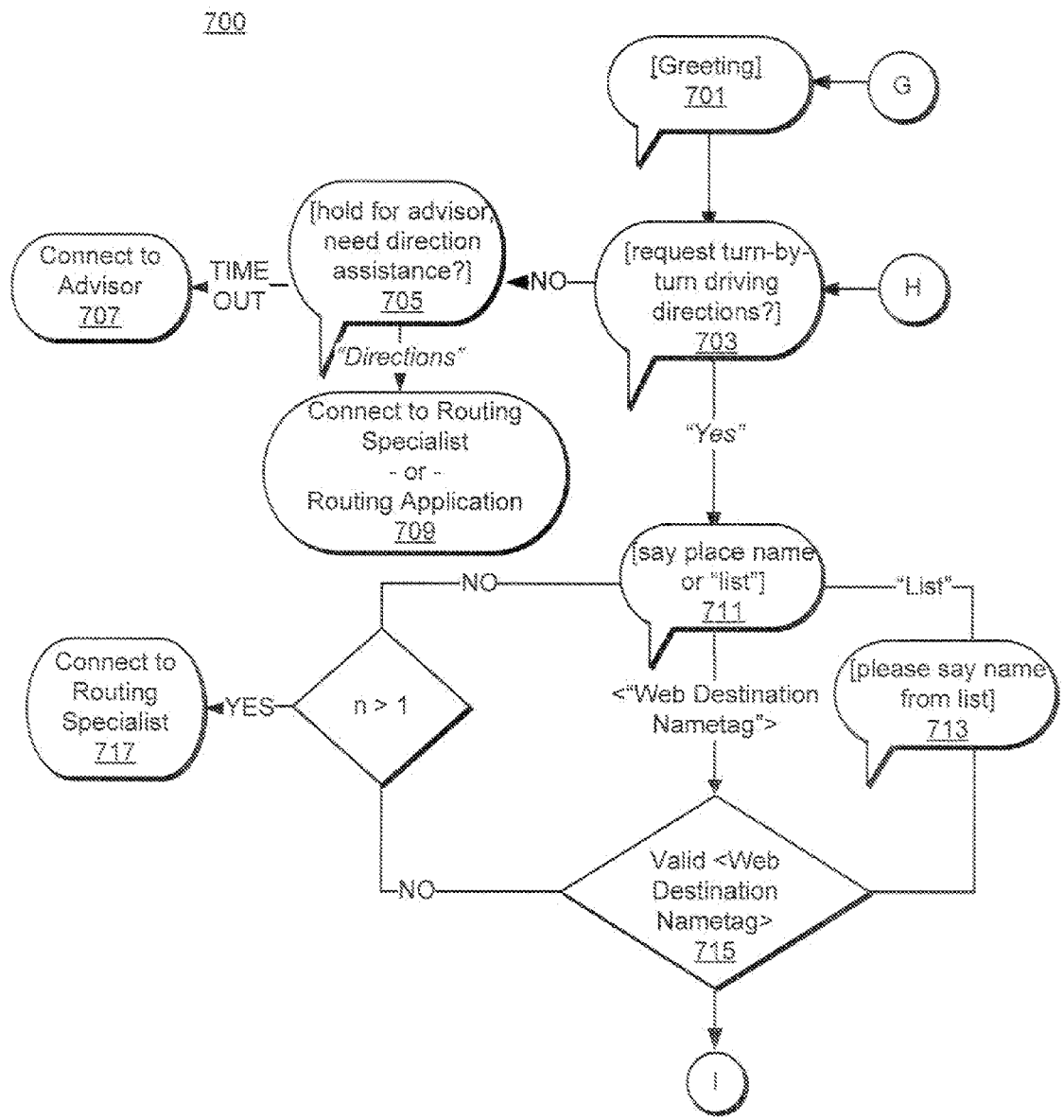
FIG. 7 is a flow chart showing yet a further process of working with previously stored destinations in conjunction with the provision of navigational assistance.

Continuing along transition points G and H, which form entry points to the process 700 of FIG. 7, the device greets the user at stage 701, and then moves to stage 703 wherein the device queries the user as to whether turn-by-turn directions are requested. It will be seen that stage 701 is entered from transition point G and stage 703 is entered from transition point H.

If turn-by-turn directions are not requested, the process flows to stage 705, and the user is queried as to whether they require direction assistance. If no response is received within a time-out period, the process 700 flows to stage 707 and an advisor, e.g., a human advisor, is contacted. If the user affirmatively asks for direction assistance at stage 705, the process flows to stage 709, wherein the device connects to a routing specialist or instantiates a routing application.

Returning to stage 703, if the user responds affirmatively, the process flows to stage 711, wherein the device prompts the user to provide a place name or to request a list. If the user requests a list, then the process 700 flows to stage 713, wherein the device reads or displays a list of destinations to the user and receives a user selection of a destination and flows to stage 715. If the user specifies a single destination name pursuant to the query of stage 711, the process flows directly to stage 715. At stage 715, if the destination nametag is valid, the process flows to transition point I.

If the user declines to state a destination or to request a list a stage 711, the process flows directly to stage 715 if there is only a single available destination, and otherwise connects to a routing specialist at stage 717.

More generally, it will now be fully appreciated that the described system and method are capable of providing a number of substantial benefits, including a convenient interface and integrated system to allow users of mobile navigational devices to remotely enter destinations via a web interface, and to later have the selected destinations wirelessly downloaded to the mobile device in conjunction with the provision of navigation assistance It will be appreciated that the foregoing methods and implementations for navigation assistance and destination selection and download are merely examples of the inventive principles, and that these illustrate only preferred techniques. It is contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method of providing navigation assistance to a user of a mobile navigation system, the mobile navigation system being wirelessly communicably linked to a call center, the method comprising:
   receiving at the mobile navigation system a signal indicating that navigation assistance is desired by the user;
   determining whether the user is a subscriber, whether the mobile navigation system is capable of receiving and conveying turn-by-turn navigation instructions, and whether the destination is routable;
   determining that there is at least one destination identity stored by the user in a database associated with the call center, and downloading the destination identity to the mobile navigation system;
   receiving a user request to download turn-by-turn navigation instructions to the least one destination; and
   downloading turn-by-turn navigation instructions from the call center to the mobile navigation system for providing navigation assistance to the user.

2. The method of providing navigation assistance to a user of a mobile navigation system according to claim 1, wherein the at least one destination identity stored by the user in the database associated with the call center was previously stored by the user via a web interface.

3. The method of providing navigation assistance to a user of a mobile navigation system according to claim 1, wherein determining that there is at least one destination identity stored by the user in a database associated with the call center comprises determining that there are multiple destination identities stored by the user in the database, the multiple destination identities having not been downloaded to the mobile navigation system, and wherein downloading the destination identity to the mobile navigation system further comprises querying the user to identify a single destination or to request a list.

4. The method of providing navigation assistance to a user of a mobile navigation system according to claim 3, further comprising:
   receiving a user request for a list;
   conveying to the user a list of the multiple destination identities stored by the user in the database;
   receiving a user selection of one of the multiple destination identities; and
   downloading the identity of the selected destination to the mobile navigation system.

5. The method of providing navigation assistance to a user of a mobile navigation system according to claim 3, further comprising:
   receiving at the mobile navigation unit, in response to querying the user to identify a single destination or to request a list, a user identification of a single destination; and
   downloading the identity of the selected destination to the mobile navigation system.

6. The method of providing navigation assistance to a user of a mobile navigation system according to claim 5, further comprising determining if the selected destination is routable by the call center.

7. A non-transitory computer readable medium having thereon computer executable instructions for providing navigation assistance to a user of a mobile navigation system, the mobile navigation system being wirelessly communicably linked to a call center, the computer executable instructions comprising:
   instructions for accepting at the mobile navigation system a signal indicating that navigation assistance is desired by the user;
   instructions for determining whether the user is a subscriber, whether the mobile navigation system is capable of receiving and conveying turn-by-turn navigation instructions, and whether the destination is routable;
   instructions for determining that there is at least one destination identity stored by the user in a database associated with the call center, and downloading the destination identity to the mobile navigation system;
   instructions for accepting a user request to download turn-by-turn navigation instructions to the least one destination; and
   instructions for downloading turn-by-turn navigation instructions from the call center to the mobile navigation system for providing navigation assistance to the user.

8. The computer readable medium according to claim 7, wherein the at least one destination identity stored by the user in the database associated with the call center was previously stored by the user via a web interface.

9. The computer readable medium according to claim 7, wherein the instructions for determining that there is at least one destination identity stored by the user in a database associated with the call center comprise instructions for determining that there are multiple destination identities stored by the user in the database, the multiple destination identities having not been downloaded to the mobile navigation system, and wherein the instructions for downloading the destination identity to the mobile navigation system further comprise instructions for querying the user to identify a single destination or to request a list.

10. The computer readable medium according to claim 9, the computer executable instructions further comprising:
    instructions for accepting a user request for a list;
    instructions for conveying to the user a list of the multiple destination identities stored by the user in the database;
    instructions for accepting a user selection of one of the multiple destination identities; and
    instructions for downloading the identity of the selected destination to the mobile navigation system.

11. The computer readable medium according to claim 9, the computer executable instructions further comprising:
    instructions for accepting at the mobile navigation unit, in response to querying the user to identify a single destination or to request a list, a user identification of a single destination; and
    instructions for downloading the identity of the selected destination to the mobile navigation system.

12. The computer readable medium according to claim 11, the computer executable instructions further comprising instructions for determining if the selected destination is routable by the call center.

13. A method of providing navigation assistance to a user of a mobile navigation system, the mobile navigation system being wirelessly communicably linked to a call center, the method comprising:

presenting a web interface to the user, the web interface having one or more user-selectable fields including a destination field;

receiving via the destination field of the web interface a user identification of a destination;

receiving via the web interface a user request to download data associated with identified destination to a database associated with the call center and in response downloading the data to the database associated with the call center;

receiving at the call center a user request to download the data associated with the identified destination to the mobile navigation system;

determining whether the user is a subscriber, whether the mobile navigation system is capable of receiving and conveying turn-by-turn navigation instructions, and whether the destination is routable;

downloading the data associated with the identified destination to the mobile navigation system; and providing to the user via the mobile navigation system directions to the identified destination.

14. The method of providing navigation assistance to a user of a mobile navigation system according to claim 13, wherein the directions to the identified destination include turn-by-turn directions.

15. The method of providing navigation assistance to a user of a mobile navigation system according to claim 13, wherein the web interface comprises a stored destinations field wherein is listed one or more destinations previously selected by the user for storage on the database associated with the call center.

16. The method of providing navigation assistance to a user of a mobile navigation system according to claim 13, wherein receiving a user request to download the data associated with the identified destination to the mobile navigation system comprises receiving a user request to download data associated with multiple stored destinations.

17. The method of providing navigation assistance to a user of a mobile navigation system according to claim 16, wherein receiving at the call center a user request to download the data associated with the identified destination to the mobile navigation system comprises receiving a user request to list the multiple destinations and receiving a user selection from the list of the identified destination.

18. The method of providing navigation assistance to a user of a mobile navigation system according to claim 13, wherein downloading the data associated with the identified destination to the mobile navigation system further comprises determining that the destination is routable by the call center.

\* \* \* \* \*